United States Patent [19]

Walchhutter

[11] 4,363,612

[45] Dec. 14, 1982

[54] FLYWHEEL AND SCREW PRESS FOR PRODUCING CERAMIC ARTICLES

[76] Inventor: Ulrich Walchhutter, Rua Corrego Tiburcino No. 74, Sao Paulo, Brazil

[21] Appl. No.: 314,508

[22] Filed: Oct. 23, 1981

Related U.S. Application Data

[63] Continuation-in-part of Ser. No. 25,085, Mar. 29, 1979, abandoned.

[51] Int. Cl.³ .............................................. B29C 3/00

[52] U.S. Cl. .............................................. 425/167

[58] Field of Search ............... 425/149, 107, 406, 419, 425/420, 355, 167, 78, 352, 337, 411, 3

[56] References Cited

U.S. PATENT DOCUMENTS

| | | | |
|---|---|---|---|
| 1,803,814 | 5/1931 | Spengler et al. | 425/355 X |
| 2,348,197 | 5/1944 | Ernst et al. | 425/352 X |
| 2,398,227 | 4/1946 | Hubbert | 425/165 X |
| 2,449,257 | 9/1948 | Tucker | 425/352 X |
| 2,770,862 | 11/1956 | Miller | 425/419 X |
| 3,191,232 | 6/1965 | Haller | 425/78 |
| 3,359,608 | 12/1967 | Walchhutter | 425/107 |
| 3,579,757 | 5/1971 | Mingotti | 425/420 X |
| 3,659,985 | 5/1972 | Marshall et al. | 425/352 X |
| 3,687,586 | 8/1972 | Hara et al. | 425/78 |
| 3,719,445 | 3/1973 | Sindelar | 425/419 X |
| 3,764,244 | 10/1973 | Hurley et al. | 425/352 X |
| 3,792,948 | 2/1974 | Martinez | 425/337 X |
| 3,868,201 | 2/1975 | Jacobson et al. | 425/78 |
| 3,938,920 | 2/1976 | Fleissner | 425/78 |
| 3,972,670 | 8/1976 | Henkel | 425/355 |
| 4,000,231 | 12/1976 | Peterson | 425/149 |
| 4,007,679 | 2/1977 | Edwards | 425/411 X |
| 4,008,021 | 2/1977 | Fedrigo et al. | 425/3 |
| 4,259,054 | 3/1981 | Savage | 425/406 |

FOREIGN PATENT DOCUMENTS

| | | | |
|---|---|---|---|
| 390955 | 12/1973 | U.S.S.R. | 425/355 |

*Primary Examiner*—J. Howard Flint, Jr.

*Attorney, Agent, or Firm*—McGlew and Tuttle

[57] ABSTRACT

A flywheel and screw press for compacting a ceramic powder includes a base, a fixed press member disposed at a spaced location above the base, a beam movably located in the space between the base and the fixed press member, and a plurality of hydraulic piston members mounted to the base and the fixed press member for variably controlling the compaction of the ceramic powder.

4 Claims, 10 Drawing Figures

FLYWHEEL AND SCREW PRESS FOR PRODUCING CERAMIC ARTICLES

CROSS REFERENCE TO RELATED APPLICATION

This is a continuation-in-part of U.S. patent application Ser. No. 25,085, filed on Mar. 29, 1979 now abandoned.

FIELD AND BACKGROUND OF THE INVENTION

The invention relates, in general, to ceramic body presses and, more particularly, to an improved flywheel and screw press for producing ceramic or refractory articles.

In the pressing of ceramic or similar parts, where the original material is a ceramic powder of a blend of silicates with binders, it is known that two phases are needed. A first phase is needed for the elimination or air and a second phase is needed for the compression. The first phase elimination of air step is the more delicate because it is related to the material plasticity characateristics, with regulation of the intensity of the pressing and of the increase and reduction curve. The compacting pressure has to be constant for all parts, and the pressure for the elimination of air varies from 1/30 to $\frac{1}{4}$ of the compacting pressure.

Research demonstrates that the interval between the first pressing step for the elimination of air and the final pressing step may be very short, shorter than the ones permitted by the present mechanical means. The power needed for a perfect elimination of the air could also be reduced with a better control of the first phase for the elimination of air.

U.S. Pat. No. 3,359,608, issued to the present inventor, discloses a friction and screw press for the manufacture of ceramic articles. The press of the present invention is an improvement of the press disclosed in U.S. Pat. No. 3,359,608 which is hereby incorporated by reference.

With the press construction of U.S. Pat. No. 3,359,608, a first and second compacting step were performed by a screw spindle, so that much of the pressing cycle time was consumed by the displacement of the screw spindle. Indeed, in the first compacting step, the flywheel had to be thrown at high speed to reduce the time of its vertical stroke and also, immediately braked before the impact to reduce its pressure. In this step, consequently, a great portion of the kinetic powerimpressed on the flywheel was lost. The second compacting step was performed by imparting an inverted rotation of about one-quarter turn to the flywheel and which was inverted to perform the second and strong compacting step immediately after.

As the flywheel had to acquire a great kinetic power in the rotation of one-quarter turn, a large horsepower motor was necessary and the friction means were consumed in a short working time. Moreover, the sum of the times inherent to the first and second pressing step impeded reduction of the period of a complete compacting cycle; and, the period was always greater than three seconds.

SUMMARY OF THE INVENTION

It is an object of the invention to eliminate the first compression strike of the screw-spindle. In accordance with a feature of the invention, a pair of hydraulic devices are provided for executing the first compacting step. The pair of hydraulic devices cooperate with other pairs of hydraulic jacks for controlling the movable beam so as to improve the conditions for eliminating the air enclosed within the mass of the material in the mold.

In this condition, the screw spindle and the associated flywheel function to execute only the second compartning step and may be thrown from their highest position with a coordinate anticipation and using a reduced power motor able to impart the due kinetic power in more than a complete turn of the flywheel instead of in a quarter turn. This advantageously means that the torque applied to the flywheel may be thrown by a motor directly and coaxially mounted on the flywheel, and not by a disc friction system.

In accordance with the invention, there is provided a flywheel and screw press for producing ceramic articles comprising, in combination, a base having an upper surface, a fixed head, support means supporting the fixed head in fixed position upwardly spaced from the upper surface of the base, a movable beam located in the space between the upper surface and the fixed head and being guided on support means for movement toward and away from the upper surface, mold means carried by the base and provided with cavities open upwardly for receiving a charge of ceramic powder material, punch means carried by the movable beam and designed to cooperate with the cavities for forming ceramic articles, a first pair of hydraulic piston means carried by the base and provided for imparting an upwardly directed thrust to the movable beam, a second pair of hydraulic piston means carried by the fixed head and provided for imparting a downwardly directed thrust to the movable beam, the first pair and the second pair of hydraulic piston means cooperating for controlling the downward stroke of the movable beam for imparting to the powder in the cavities a soft precompression causing a first thickness reduction of the powder mass and an appreciable expulsion of the air enclosed therein, a third pair of hydraulic piston means carried by the fixed head and controlled for acting on the movable beam and performing the first compacting step after the soft precompression, a fourth pair of elastically compressible hydraulic piston means carried by the base and provided with adjustable rod ends and able to interfere with the movable beam when the latter is further lowered during the first compacting step for impressing to the movable beam an upwardly directed thrust helping the elastic return of the compacted powder mass to raise the movable beam immediately after the first compacting step, allowing the expulsion of the remaining air, a flywheel disposed above the fixed head, a screw threadably engaged to the flywheel and carried by the fixed head, motor means provided for alternatively imparting to the flywheel and the screw rotation in one and in the other direction for lowering and raising the flywheel and screw, and control means for controlling the motor means to operate the flywheel and screw in the lowering direction in due time for impacting the movable beam and performing a strong second and ultimate compacting step of the powder material immediately after the elastic return of the powder material, and hydraulic circuit means for timely controlling and driving all the pairs of the hydraulic piston means, the hydraulic circuit means interconnecting all of the pairs of the hydraulic piston means.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which preferred embodiments of the invention are illustrated.

DETAILED DESCRIPTION OF PREFERRED EMBODIMENTS

Figure 1:
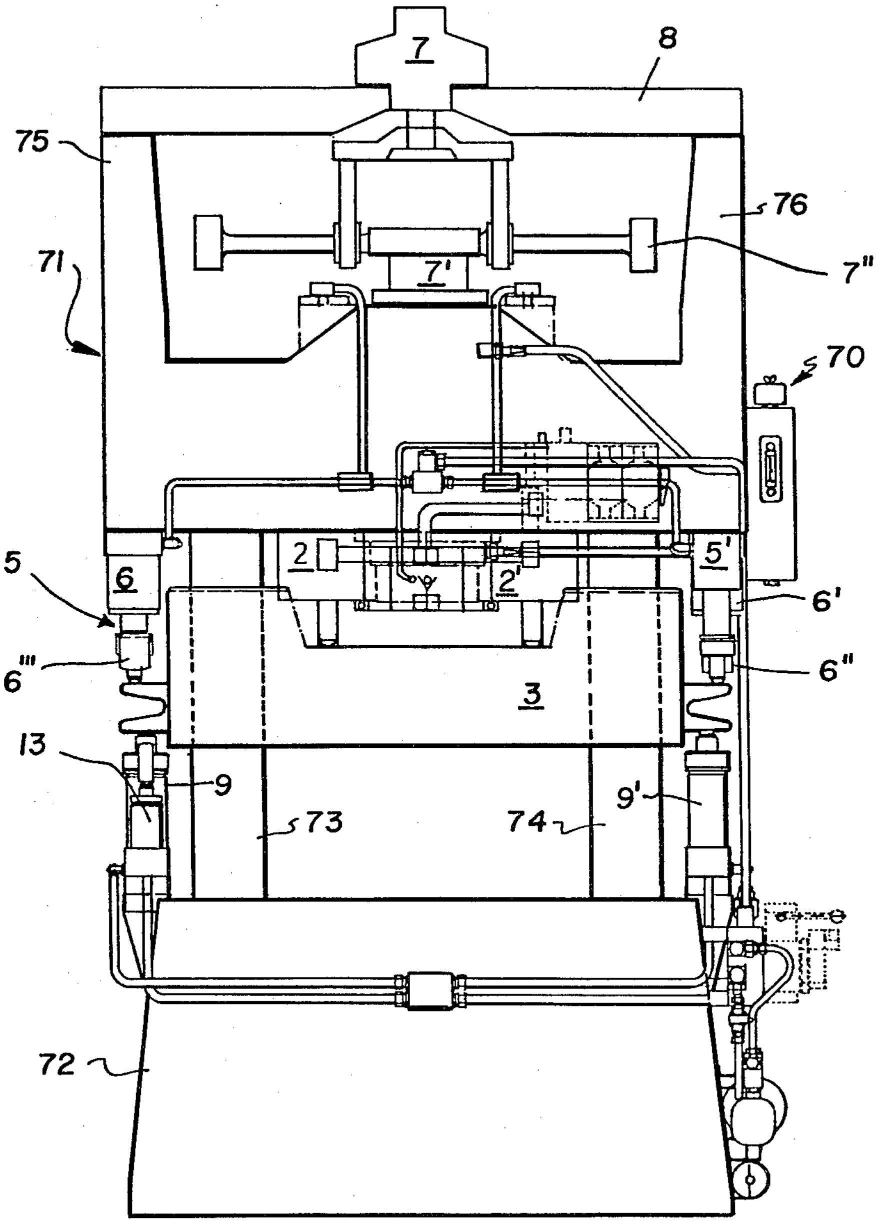
FIG. 1 is a schematic front elevation view of the installation of a ceramic press in accordance with an embodiment of the present invention.

Referring now to the drawings, in particular, wherein like reference characters designate like or corresponding parts throughout the several views, there is shown a press 70 for pressing a ceramic powder, for example, a blend of silicates with binders. The press 70 includes a traverse beam 3 movably mounted on two press uprights 73, 74 for movement relative to a fixed beam or press head 71 and a base 72. Movable beam 3 is located in the space between the upper surface of bore 72 and the fixed beam or press head 71 and is guided on the uprights 73, 74 for movement toward and away from said upper surface. Mould means (not shown) are carried by the base 72 and provided with cavities opened upwardly for receiving a charge of ceramic or refractory powder. Punch means (not shown) are carried by movable traverse beam 3 and designed to cooperate with the cavities for forming ceramic or refractory articles. The press head 71 is provided with two upwardly extending arms 75, 74, upon which a beam 8 is supported.

The press includes hydraulic piston 5, 5′ mounted to the press head 71 in addition to the conventional two pistons 2, 2′ which have the maximum pressing power of approximately ¼ to 1/10 of the pressure of the main pressing body and which operate together with the pistons 5, 5′. Pistons 5, 5′ are used for the rapid approximation, determining also the filling of the chambers of the above mentioned pistons 2, 2′.

The element of the first pressing operation is disposed coaxially opposite to the compacting piston or beam 3 on base 72, if the main pressing element is a hydraulic piston.

Pistons 9, 9′ may be mounted on base 72 for operative engagement of the plungers thereof with beam 3 for the return stroke of the beam 3 after the pressing cycle, and the consequent emptying of the chambers associated with the two pistons 2, 2′.

In order to reduce the work of the main element, that is a screw 7′ and an associated flywheel 7″, there is only one pressing operation for each cycle. Moreover, it is possible to control the movement of the flywheel 7″ and screw 7′ by operating a hydraulic motor 7, having a relatively reduced dimension, installed on the beam 8 to move the screw 7 through a detachably coupled system which is hydraulically interconnected to pistons 9, 9′.

Through the hydraulic motor 3 it is possible to regulate the speed of the flywheel 2″ and, consequently, the pressing force of the screw 7′, for the purpose of compacting.

Figure 4:
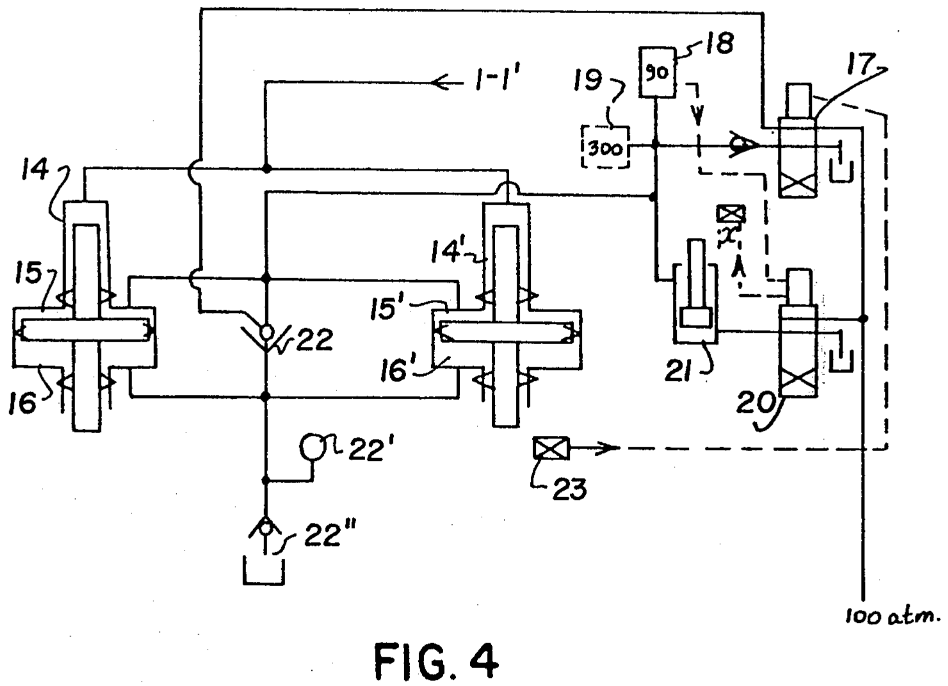
FIG. 4 is a schematic illustration of a hydraulic circuit for the ceramic press of FIG. 3.

To regulate the air elimination step, besides the means provided in U.S. Pat. No. 3,359,608 chambers of the pistons 2, 2′ are fed by an illustrative circuit, which provides a controlled oil volume at high pressure, or pressure regulation through a "pressostat" 18 or 19, shown in FIG. 4.

The synchronization between the action of the circuit with a known arrangement, such as is disclosed in U.S. Pat. No. 3,359,608, the action of the pistons 2, 2′ and the action of the screw 7′, is accomplished by electronic means, with the use of temporizer elements, which may be regulated in order to achieve the shortest possible interval between one and the other action, comparing with the characteristics of the material to be pressed.

In accordance with the present invention, if there is no inversion of the flywheel between the first and second pressing operation, there is less wear and a minor use of energy to operate the press. A hydraulic power piston may be substituted for the screw and flywheel.

Directional electrovalves may be replaced by hydraulic logic elements, namely, by directed non-return check valves.

It is understood that in operation the hydraulic fluid in the chambers of pistons 9, 9′ is discharged and the beam 3 is lowered.

Figure 6:
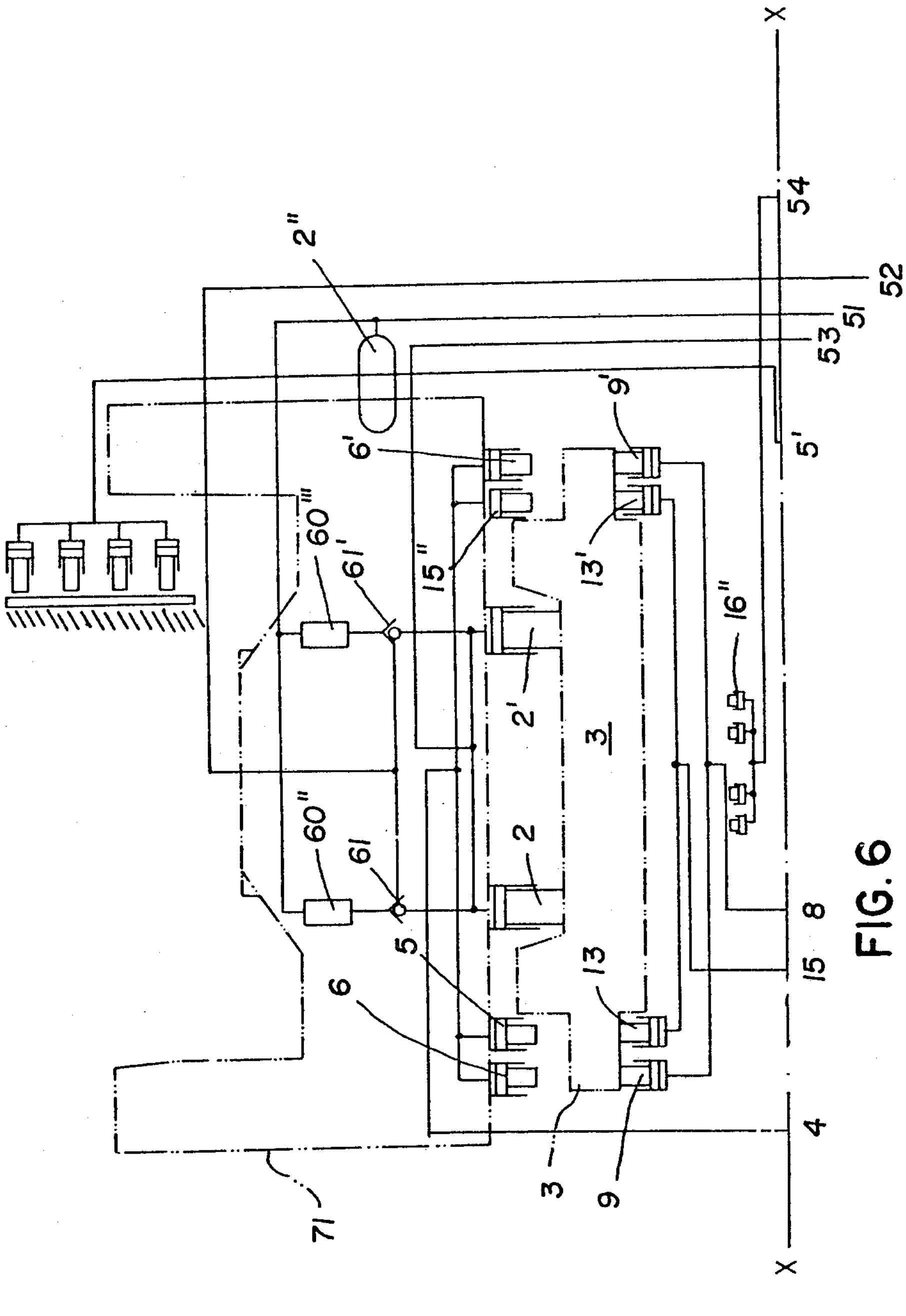
FIGS. 6 and 7 illustrate a complete hydraulic circuit for controlling the press of FIG. 3.
Figure 7:
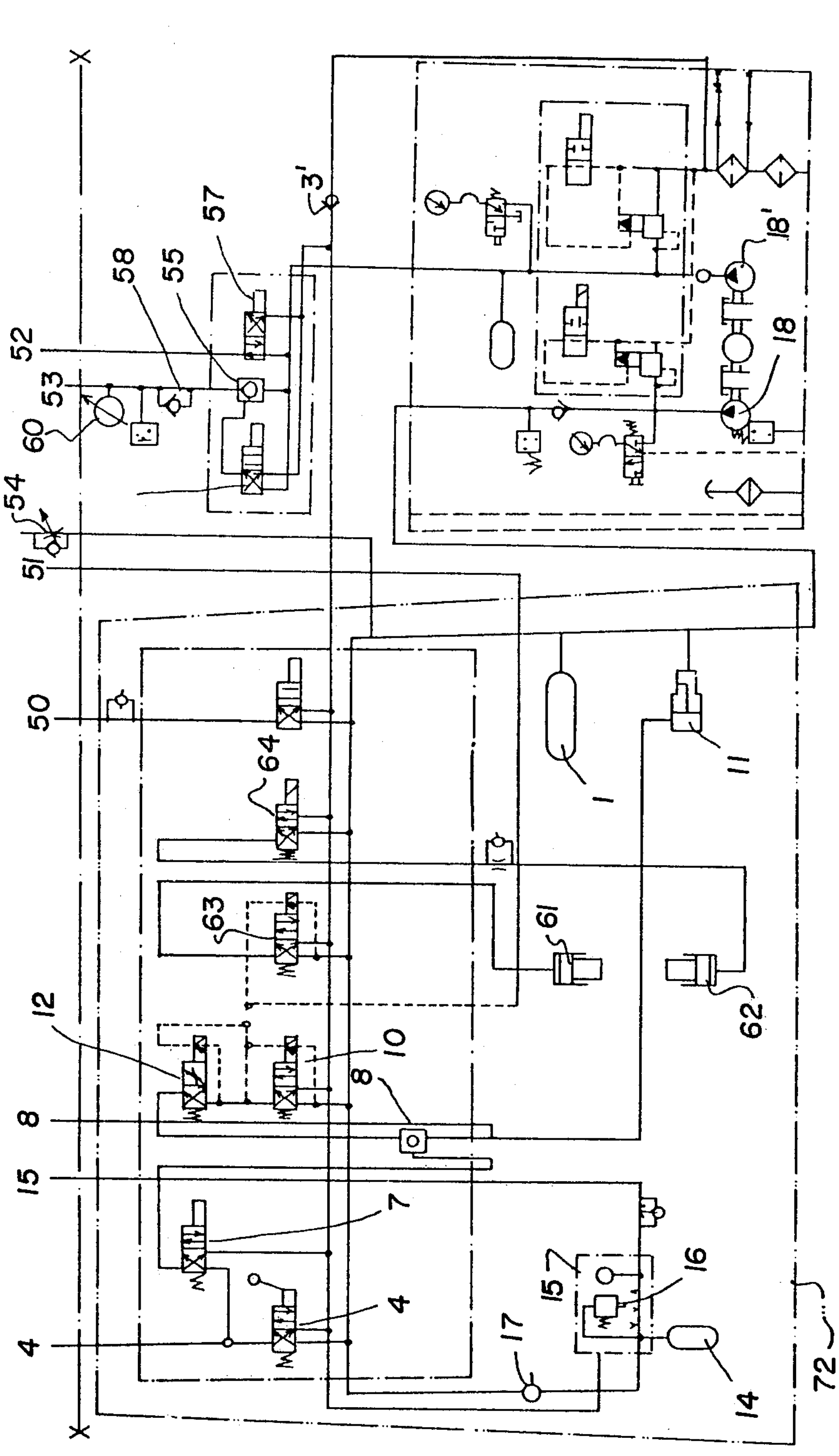
Figure 8:
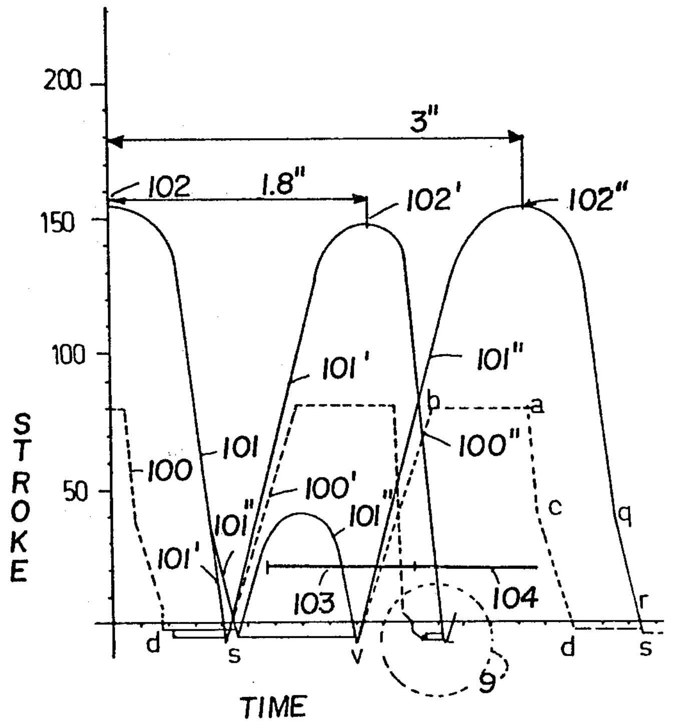
FIG. 8 is a schematic illustration of the cycle of the press, in accordance with the invention, in which the ordinate represents stroke and the abscissa represents time.

When beam 3 reaches the maximum point, a proximity switch 23 (see FIG. 4) is intercepted. Switch 23 energizes the valve 17 to disconnect the pilot of a check valve 22 and introduces oil at a pressure of 100 atmospheres into the chambers 15 and 15′ of dynamic oil accumulators 14, 14′ which may be hydraulically connected to pistons 13, 13′ as shown in FIGS. 6 and 7. During the lowering of beam 3 and with the valve 22 open, the oil may pass freely between the chambers 15, 15′ and 16, 16′.

A pressostat 18 calibrated at 90 atmosphere, energizes a valve 20 which feeds a multiplier 21 taking the necessary pressure to the oil, with this pressure being predetermined through a pressostat 19.

Said pressostat 19, when energized, determines the end of the HP (high pressure) step, deenergizing the valves 20 and 17.

The multiplier 21 returns through a spring applied externally to said multiplier.

With the return of the multiplier 21 the valve 17 is also deenergized, discharging the chambers 15 and 15′ and regulating the valve 22 communicating the chambers 15, 15′ and 16 and 16′.

Then, the pressing phase is ended.

It should be also understood that it is possible to have the multiplier return by adding a reservoir 22' on the discharge of the air chambers and calibrated retention valve 22" in such a way as to maintain the remaining pressure in the chambers 15, 15' and 16, 16" to a value of about two to five times the atmospheric value.

The multiplier may be substituted by a high pressure pump.

The pressostat 14 of 300 atm may be replaced by a proximity switch (x) assembled on the multiplier 21, in such a way that, after the predetermined course of said multiplier 21, the cycle may be ended.

Therefore, instead of ending the first pressing with the value of the pressing, the volume of oil at high pressure may be used. For the ceramic effects, this will bring about a benefit, as well as for the mechanical effects, providing a higher precision.

HYPOTHETICAL EXAMPLE

Hypothesis of pre-pressing in hydraulic screw press:

| | |
|---|---|
| Maximum necessary pressing | 160 tons |
| Course of maximum pre-pressing | 5 mm |
| Maximum course of the piston | 100 mm |
| Prefilling | 100 atm. |
| Multiplications | $\frac{1}{3}$ |

For the evaluation of the diameters of the pistons 15, 15', we have:

$$\frac{160\ \text{ton}}{100\ \text{atm}} \times \frac{1}{3} = \frac{160{,}000\ \text{kg}}{100\ \text{kg/sq. cm.}} \times \frac{1}{3} = 533.33\ \text{cm}^2$$

thus, 533.33 $cm^2$ − 2 pistons = 266.67 $cm^2$ piston; therefore, radius = 266.67 = 84.88 = 9.21 cm Finally, 0 (pistons 15, 15') = 2×9.21 = 18.42 cm.

As 30 cycles /min, for each piston, we have 3 mm of maximum course, at 100 atm 2 mm of maximum course, at 300 atm the oil consumption, during 1 min, will be: at 100 atm, $$533.33\ \text{cm}^2 \times 0.3\ \text{cm} \times 30\ \text{cycles} \times 3 = 14,391\ \text{cm}^3 = 14.39$$

and at 300 atm, $$533.33\ \text{cm}^2 \times 0.2\ \text{cm} \times 30\ \text{cycles} = 3.198\ \text{cm}^3 = 3.20$$

So we have the total of 14.39 + 3.20 of oil consumption during 1 min.

The oil required for chambers (1, 1') during preliminary course is $$25.12\ \text{cm}^2 \times 10\ \text{cm} = 250.2\ \text{cm}^3 = 0.25$$

Figure 3:
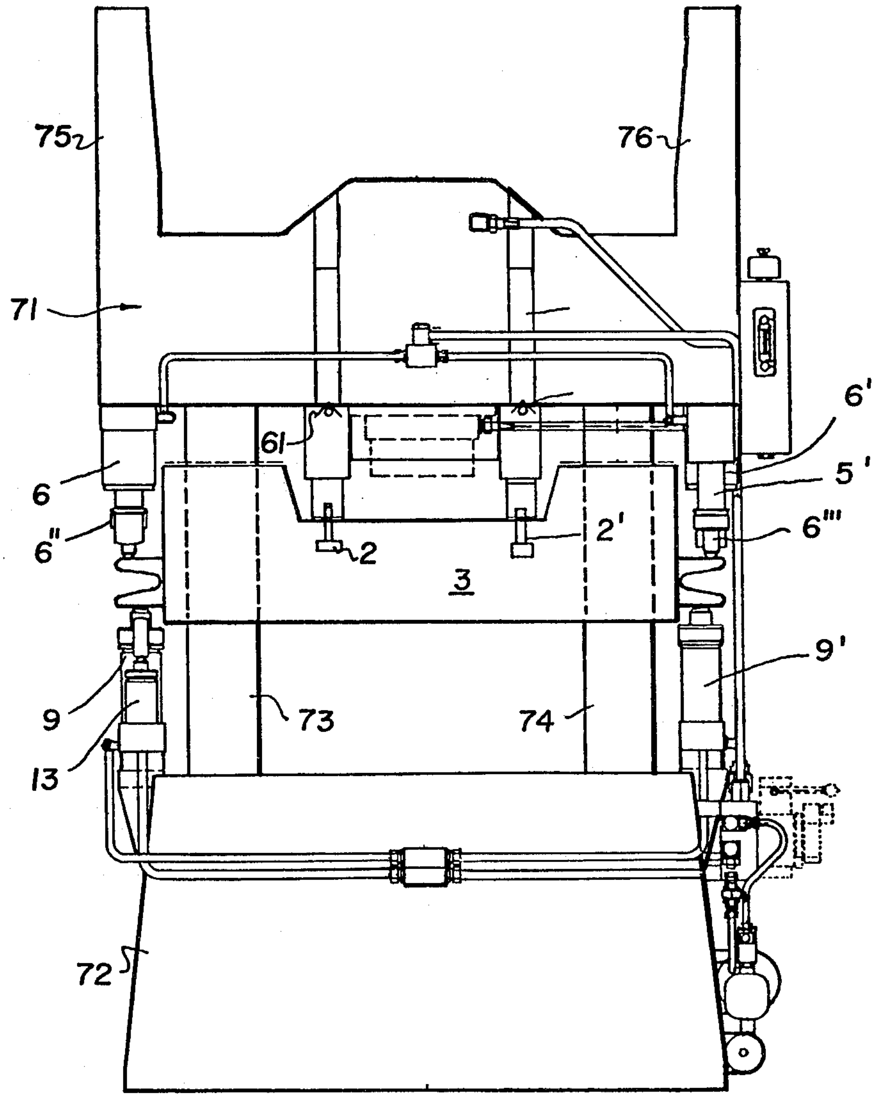
FIG. 3 is a schematic front view of a ceramic press, in accordance with an alternate embodiment of the invention.
Figure 5:
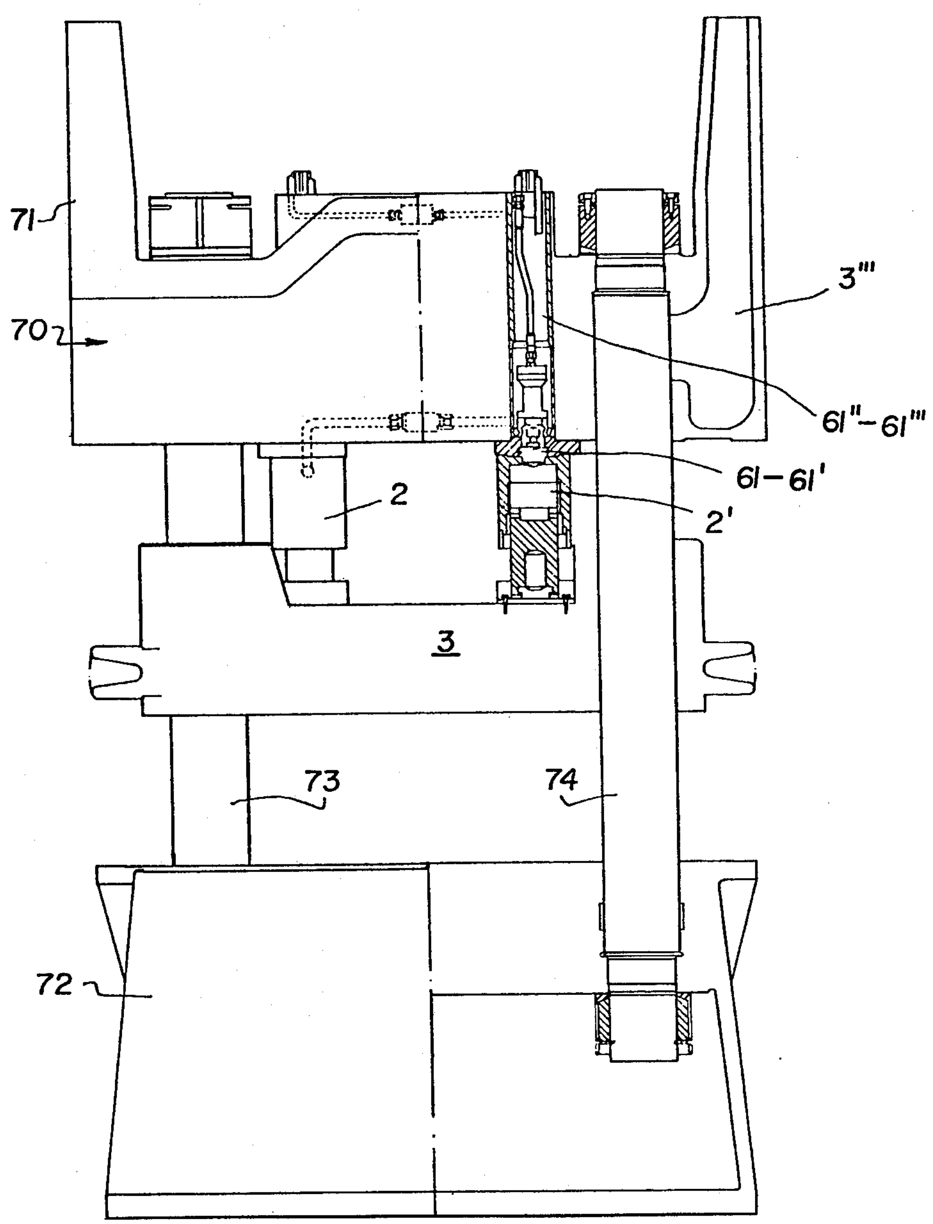
FIG. 5 is a schematic front elevation, partly in section, of the ceramic press of FIG. 3 detailing one of two cylinders interchangeably used for the pressing step.
Figure 5A:
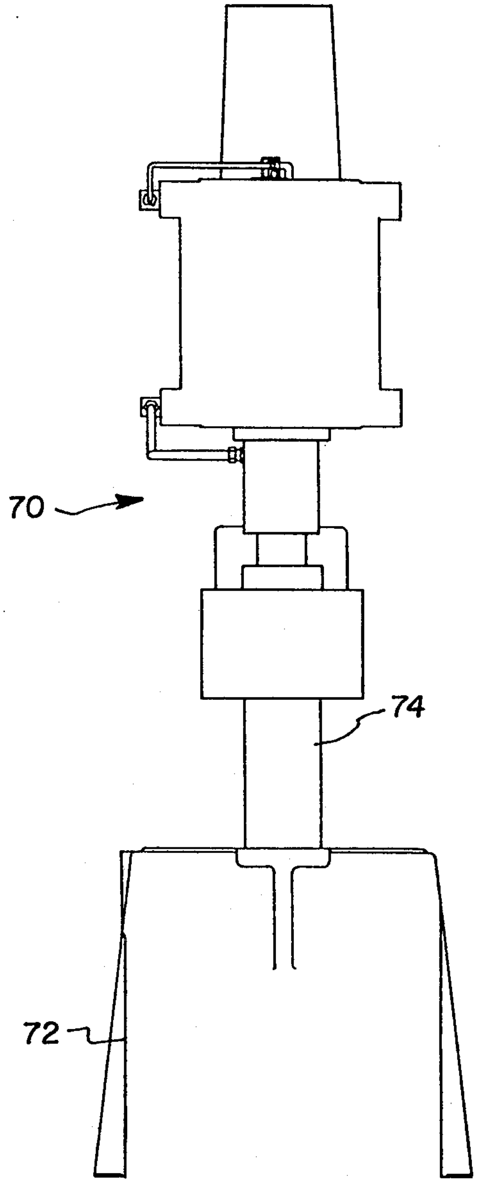
FIG. 5A is a schematic side view of the illustration of FIG. 5.

Another alternative embodiment of the invention is shown in FIG. 3, and is illustated in greater detail in FIGS. 5, 6 and 7. The drawings described below are related, specifically, to this second embodiment, but may be valid also relative to the first one.

In FIG. 3, lines 40 and 41 are representative of the screw stroke, and lines 30, 31, 31', 33, 34, 35, 36 and 43 are representative of the stroke of beam 3. In a high position 30 the beam 3 is supported by the pistons 9 and 9' against the adjustable plunger heads 6" and 6'" of the pistons 6 and 6'. The power of the pistons 9 and 9' is such that it exceeds the weight of the beam 3 and the force of the pistons 5 and 5'.

The force of the pistons 6 and 6', however, is greater than the force of the pistons 9 and 9'.

Figure 9:
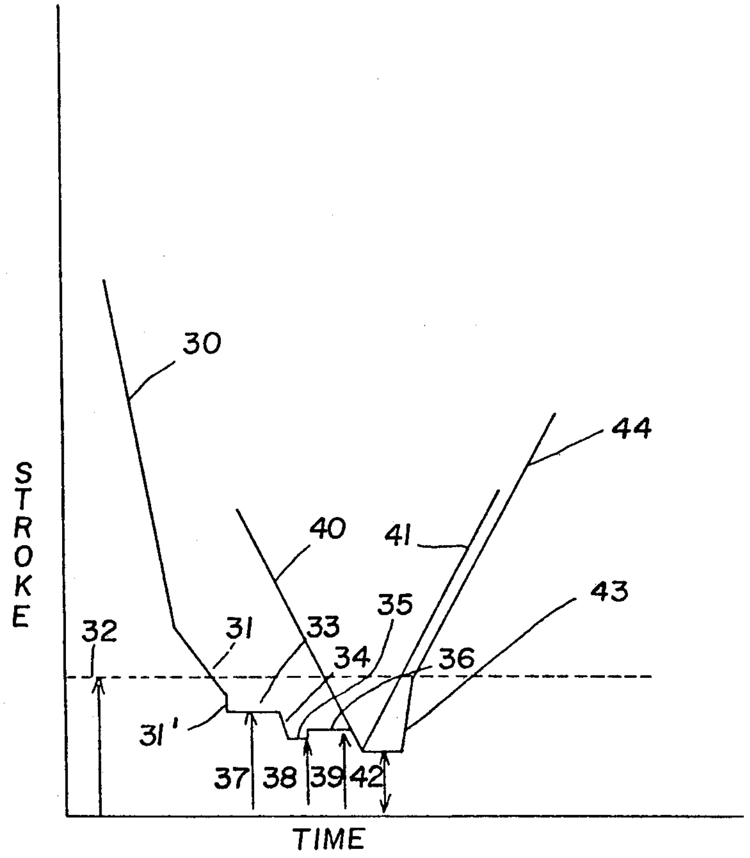
FIG. 9 is a schematic detail of a portion of the cycle of the inventive arrangement illustrated in FIG. 8.

In FIG. 9, the step represented by line 30 represents the fast lowering down stroke path of the beam 3 due to its own weight and the action of the pistons 5 and 5' when the discharge of the pistons 9 and 9' is commanded by the valves 8-12 and 10. The line portion 31 is the braked down motion to meet the mass to be pressed at filling (level 32) with low speed, in order to avoid the expulsion of the ceramic powder from the casting mould and a violent contact between the punches and the moulds, in the case of mirror moulds (nonpentrating).

The speed and the duration of the braking portion are regulated by, respectively, the control of the piston through valve 12 in the position of energizing of said valve.

The step represented by line 31' is the continuation of the down movement of the beam 3 after the conclusion of the phase 31 of the braking, is the pressing until meeting the equilibrium point between the pressure applied and the reaction force of the mass then pressed (at level 37). The pressure applied at this moment is determined and given by the weight of the beam 3 plus the action of the pistons 5 and 5' (less the force of the pistons 16" of support of the mould in case of use of the mirror type mould).

During the step 31 and 31', the filling of the piston chambers 2 and 2' is effected through the valves 61 and 61'.

Line 33 illustrates the time during which the above filling conditions take place.

The time for such courses is determinable, by delaying the pressure phase of the pistons 2 and 2' through the valves 55 and 56.

The function of the step of line 32 is the preliminary elimination of air (deaeration) from the ceramic mass.

The inclined portion 34 represents the second compression given by the action of the pistons 2 and 2', or the effect of the oil pressure of the oil entering through the valve 55, commanded by the pilot 56 which is driven by a signal function dependent on the position of the beam 3 during the down movement.

The action speed of the pistons 2 and 2' and, therefore, the inclination of said portion, is regulated by a choke 58.

The line 35 (level 38) represents the equilibrium point between the total pressure applied by the weight of the beam plus the action of the pistons 5 and 5', plus the action of the pistons 2 and 2', minus the action of the pistons 13 and 13' but only with regulations at a satisfactory level (and, in case of utilization of the mirror type mould, the power of the pistons 16").

The action of the pistons 2 and 2' is preponderant.

It should be noted that both pumps 18 and 18' are connected, besides, to the normal protection parts and regulation parts, to two inert gas accumulators 1 and 1', which allow for a potent and instant flow.

The force applied during this phase is, therefore, regulated by a pressostat which commands (at the same time with the timer and with the purpose of disconnecting the intervening elements) the valves 56 and 57, respectively, close the valves 61 and 61' of rapid discharge of the pistons 2 and 2'.

The pressure achieved may be read in the manometer, that is, pressure gauge 60.

The time of this phase is a function of the regulated pressure and of the reaction of the mass to be pressed and of the characteristics of the hydraulic circuit.

The time is not regulated, for it is the minimum possible one.

Level 38 is a function of the compressibility of the mass and the applied pressure.

The modulated line 36 represents in the first portion, an elastic return of the mass to be pressed due to the air which is contained in it, in the second portion, a reduction of the volume due to the exit of the air.

In order to achieve a fast and total exit of the air through the opening of the mould during the step 36, besides varying the applied force during the step represented by line 36, it is important to act on the regulation of the force during the phase 34, in such a way to avoid the binding of the mass of particles, therefore forming a "box" which would trap the air.

The second portion of the line 36 goes down due to the exit of the air; the duration of the exit of the air is around 50 mm/seconds.

The force applied to the mass during this last phase is given by the weight of the beam 3 plus the pressure of the pistons 5–5', minus the force exerted by the pistons 13 and 13', which is contrary to the prior one, minus the eventual pistons 16''.

The force of the pistons 13, 13' is predetermined by charging the dynamic oil accumulator 14 (with a type of inert gas charge) with the pressure of the oil dynamic circuit derived from the pump 18 limiting it and discharging it with the maximum pressure valve 16'.

The portion 13 and 13' is such that bind the force of the pistons 5 and 5' and of the weight of the beam when a previous charge is given from the accumulator 14 with all pressure of the circuit of the pump 18.

In such a way, the force applied to the mass to be pressed during the phase 36 may vary, from zero (immediately raising the moulds regarding the mass) up to the value given by the weight of the beam plus the pistons 5 and 5', without interruption.

The portion 40 represents the down movement due to the treading of the main screw 7' with the rotation given by the deriving element of the flywheel 7'' together with said screw 2.

For the effect of the kinetic energy accumulated at the flywheel 2'' during the stroke and which is discharged at the moment of contact with the prepressed and already without air mass, the level 39 develops a strong instantaneous pressure, with a duration of, approximately, thirty-five thousandths of a second.

The time duration of the prior phase 36 may be changed, by changing the instant of stroke of the flywheel, for example, by a fixed signal attached to the ear plus a regulated timer, in such a way that the pressure of the screw reaches the value when the air is taken out from the mass to be pressed, without unnecessary delays.

The pressure exerted by the screw 7' on the material may be predetermined in an exact manner, with the possibility of using limited torque generators for the stroke of the flywheel, such as hydraulic motors, electric motors or friction motors with limited torque relatively to the motor used up to this moment.

Actually, the stroke may occur in a total turn, instead of a ¼ turn, that is, with a set of forces twenty times as strong, with evident advantages.

Level 42 is the one reached after the material has suffered the pressure of the screw and represents the final disposition of the pressed mass.

Line 41 illustrates the return of the screw, which has to be thrown in an up movement with a power of less value than that supplied for the elastic return of the structure of the pressing machine.

Line 43 indicates the extraction of the pressed part by the mould due to the piston commanded by the respective valves 63 and 64 in synchronism with the beam and the screw in a new up movement achieved by known command circuits.

In summary the operation of the inventive press utilizes first piston means 9, 9' to move the beam upwardly or retract the beam from the base, second piston means 5, 5' for moving the beam downwardly toward the base into its operating position, and third piston means 2, 2' for exerting a further downward force on the beam to move the beam toward the base and compress the ceramic powder to release air therefrom. Fifth piston means 13, 13' are provided for exerting a force in a direction opposite to the movement imparted by the third piston means 2, 2' and establish an equilibrium of the forces acting on the beam. After this phase, compaction means in the form of screw 7' operate to further compress the ceramic powder in a final compression stage.

During the fast up movement of beam 3 due to the pistons 9 and 9', the oil retained in the pistons 2 and 2' is forced to exit through the valves 61 and 61' (FIGS. 5 and 6) very quickly.

In order to avoid the formation of vacuum, the maximum limit valve 3' of FIG. 7 presses the general discharge line 51 of the hydraulic circuit.

The accumulator 2'' of FIG. 6, precharged with inert gas, is in condition to absorb the instantaneous flow forces in order to discharge them, later, in a slower speed, through the maximum limit valves 3' already regulated.

On the fixed beam 3''' of FIG. 5, there are the chambers 61'' and 61''' which serve to diminish the turbulences at the moment of discharge and aspiration of valves 61 and 61'.

It should be noted that the total pressing phase may be evaluated:

Phase 31:30 ms; Phase 33=50 ms; phase 34=80 ms.

Phase 35=30 ms; phase 36=70 ms; final stroke of the screw=35 ms.

Thus, the total pressure time is 285 ms as compared to a minimum of 1,300 ms of the pressing machines.

For a better understanding, there is indicated below, the diameter of the pistons:

| Piston | Diameter |
|---|---|
| 5, 5' | 40 mm |
| 6, 6' | 70 mm |
| 13, 13' | 50 mm |
| 4, 4' | 55 mm |
| 2, 2' | 120 mm |
| 16 | 65 mm |

The above-mentioned diameters are good for a pressing machine with a net pressing power of 400 to 500 tons. All pistons operate at 100 atm, approximately, as working pressure.

The pistons 2 and 2' may be regulated up to 200 or 300 atm (pump 18), and normally operate from 50 to 100 atm.

Presses of different power shall have pistons with different diameters for different working pressures.

On the other hand, it should be noted that the regulation of the applied forces does not exert practical influence on the total time of the cycle. Moreover, the regulation of the different phases amongst them, which is different from what would occur with the present machines, where the signalization of the first and second pressing steps are related one to the other.

Experimentally, with a pressing machine in accordance with the present invention, it would be observed that the necessary power for the first pressing operation, with predetermined masses of ceramic, can be quite low, approximately 10–12,000 kg., against the 400,000 Kg of the second pressing operations, which is quite different from the present pressing machines, which require about 50 to 150 tons for the first pressing step.

This is presumably possible due to the speed with which the several steps are compacted, which beneficially influences the elimination of the air and the reduction of the power, which reduces the criticality of the changing characteristics of the mass itself.

Another very important benefit was observed, it is the fact that the moulds do not have to be clean, which is an important factor on the productivity (besides, of course, of the benefit achieved by the higher speed on the quality of the material produced and the need of the quality inspection.

Regarding the present pressing machines, the number of strokes achieved between the washing phases of the moulds, is from 2 to 3 times as great. The samples of productivity, limited to the short operation, indicate, approximately, a double value for the production.

Another advantage is found in the constant values of the operation, without variation in the time parameters.

Figure 2:
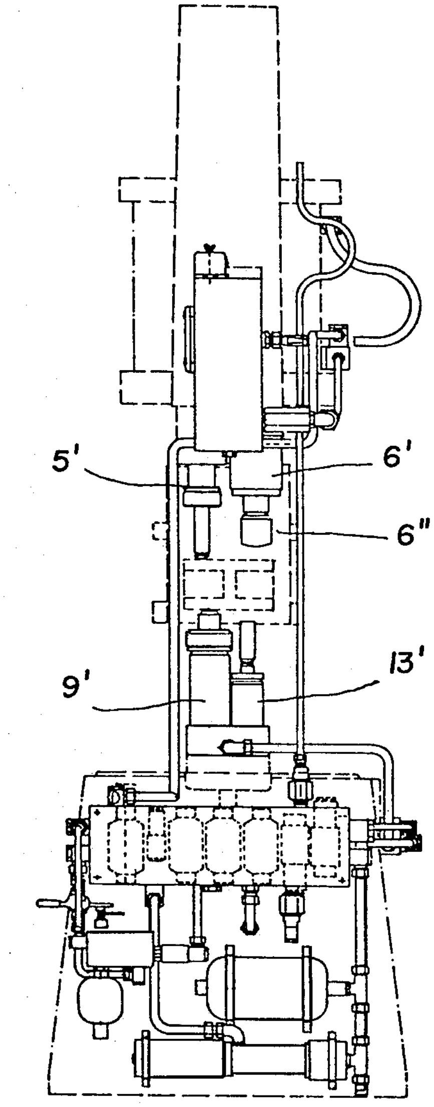
FIG. 2 is a schematic side elevation view of the ceramic press shown in FIG. 1.

In FIG. 2, line 100 indicates the path of the beam 3 and the line 101 the paths of the screw 7' during the step of putting the press 70 into operation.

The lines 100' and 101' are respectively, courses of the beam 3 and the screw 7' with the proposed system. The lines 100" and 101" are the courses related to the present machines.

The point 102 is the starting (zero) point with the press in high position.

The point 102' is the point of arrival, after a cycle, with the presser following this present invention.

The point 102" is the arrival point after the first cycle, with the normal pressing machine. Reference numerals 3" and 1.8" are the effectivation points, that is, length L of a complete cycle of the normal machine and of the proposed one, respectively.

Reference numerals 103 and 104 represent the interaction time of the car which carries the mass and the extraction of the pressed material.

Thus, in accordance with the invention, there is provided a flywheel and screw press for producing ceramic articles comprising, in combination, a base 72 having an upper surface; a fixed head 71; support means 73, 73 supporting said fixed head 71 in fixed position upwardly spaced from said upper surface of said base 72; a movable beam 3 located in the space between said upper surface and said fixed head 71 and being guided on said support means 73, 74 for movement toward and away from said upper surface; mould means carried by said base 71 and provided with cavities open upwardly for receiving a charge of ceramic powder material, punch means carried by said movable beam 3 and designed to cooperate with said cavities for forming ceramic articles, a first pair of hydraulic piston means 9, 9' carried by said base 72 and provided for imparting an upwardly directed thrust to said movable beam 3; a second pair of hydraulic piston means carried by said fixed head and provided for imparting a downwardly directed thrust to said movable beam 3, said first 9, 9' and second 6, 6' pair of hydraulic piston means cooperating for controlling the downward stroke of said movable beam 3 for imparting to the powder in the cavities a soft pre-compression causing a first thickness reduction of the powder mass and an appreciable expulsion of the air enclosed; a third pair of hydraulic piston means 5, 5' carried by said fixed head 7 and controlled for acting on the movable beam 3 and performing the first compacting step after the soft pre-compression; a fourth pair of elastically compressible hydraulic piston means 13, 13' carried by said base 72 and provided with adjustable rod ends and able to interfere with said movable beam 3 when the latter is further lowered during said first compacting step for impressing to said movable beam 3 an upwardly directed thrust helping the elastic return of the compacted powder mass to raise said movable beam 3 immediately after said first compacting step, allowing the expulsion of the remaining air; a flywheel 7" disposed above said fixed heat 71, a screw 7' threadedly engaged to said flywheel 7" and carried by said fixed head 71; motor means 7 provided for alternatively imparting to said flywheel 7" and screw 7' rotation in one and in the other direction for lowering and raising flywheel and screw, and control means for controlling said motor means 7 to operate said flywheel and screw in the lowering direction in due time for impacting said movable beam 3 and performing a strong second and ultimate compacting step of the powder material immediately after the elastical return of the powder material; and hydraulic circuit means for timely controlling and energizing all the pairs of said hydraulic piston means, said hydraulic circuit interconnecting all the pairs of said hydraulic piston means.

The third pair of hydraulic piston means are, in a preferred embodiment, single acting hydraulic jacks 5, 5', each one having chamber filled with oil at reduced pressure during the lowering movement of the movable beam 3 and energized with an adequate high pressure, for performing the first comparting step.

The flywheel and screw are movable from an upper position and a lower position, the latter being the position wherein the second compacting step is performed, the space from the upper and the lower position being such that the flywheel and the screw must rotate at about a turn for moving from one to the other position.

The control means for said motor means include means able to anticipate the starting of the lowering displacement of the flywheel and screw so that the second compacting step is performed without delay immediately after the elastic return of the powder material.

While specific embodiments of the invention have been shown and described in detail to illustrate the application of the principles of the invention, it will be understood that the invention may be embodied otherwise without departing from such principles.

What is claimed is:

1. A flywheel and screw press for producing ceramic articles comprising, in combination, a base having an upper surface; a fixed head; support means supporting said fixed head in fixed position upwardly spaced from said upper surface of said base; a movable beam located in the space between said upper surface and said fixed head and being guided on said support means for movement toward and away from said upper surface; mould means carried by said base and provided with cavities open upwardly for receiving a charge of ceramic powder material, punch means carried by said movable beam and designed to cooperate with said cavities for forming ceramic articles, a first pair of hydraulic piston means carried by said base and provided for imparting an upwardly directed thrust to said movable beam; a second pair of hydraulic piston means carried by said fixed head and provided for imparting a downwardly directed thrust to said movable beam, said first and second pair of hydraulic piston means cooperating for controlling the downward stroke of said movable beam for imparting to the powder in the cavities a soft pre-compression causing a first thickness reduction of the powder mass and an appreciable expulsion of the air enclosed; a third pair of hydraulic piston means carried by said fixed head and controlled for acting on the movable beam and performing the first compacting step after the soft pre-compression; a fourth pair of elastically compressible hydraulic piston means carried by said base and provided with adjustable rod ends and able to interfere with said movable beam when the latter is further lowered during said first compacting step for impressing to said movable beam an upwardly directed thrust helping the elastic return of the compacted powder mass to raise said movable beam immediately after said first compacting step, allowing the expulsion of the remaining air; a flywheel disposed above said fixed head, a screw threadedly engaged to said flywheel and carried by said fixed head; motor means provided for alternatively imparting to said flywheel and screw rotation in one and in the other direction for lowering and raising said flywheel and screw, and control means for controlling said motor means to operate said flywheel and screw in the lowering direction in due time for impacting said movable beam and performing a strong second and ultimate compacting step of the powder material immediately after the elastic return of the powder material; and hydraulic circuit means for timely controlling and energizing all the pairs of said hydraulic piston means, said hydraulic circuit means, interconnecting all the pairs of said hydraulic piston means.

2. A flywheel and screw press according to claim 1, wherein the third pair of hydraulic piston means are single acting hydraulic jacks, each one having chamber filled with oil at reduced pressure during the lowering movement of the movable beam and energized with an adequate high pressure, for performing the first compacting step.

3. A flywheel and screw press according to claim 1, wherein said flywheel and screw are movable from an upper position and a lower position, the latter being the position wherein the second compacting step is performed, the space from the upper and the lower position being such that the flywheel and the screw must rotate at about a turn for moving from one to the other position.

4. A flywheel and screw press, according to claim 1 or 2, wherein said control means for said motor means include means able to anticipate the starting of the lowering displacement of the flywheel and screw so that the second compacting step is performed without delay immediately after the elastic return of the powder material.

* * * * *